(12) United States Patent  (10) Patent No.: US 8,606,845 B2
Dickinson et al.  (45) Date of Patent: *Dec. 10, 2013

(54) RSS FEED GENERATOR

(75) Inventors: Richard L. Dickinson, Seattle, WA (US); Michaeljon Miller, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1343 days.

This patent is subject to a terminal disclaimer.

(21) Appl. No.: 11/323,226

(22) Filed: Dec. 30, 2005

(65) Prior Publication Data

US 2007/0156809 A1    Jul. 5, 2007

(51) Int. Cl.
 *G06F 15/16* (2006.01)
 *G06F 17/30* (2006.01)
(52) U.S. Cl.
 USPC ............................................ 709/203; 707/706
(58) Field of Classification Search
 USPC .......... 709/201–208, 217–219; 707/705–713, 707/758–759
 See application file for complete search history.

(56) References Cited

U.S. PATENT DOCUMENTS

| 6,807,558 | B1 | 10/2004 | Hassett et al. |
| 2002/0115447 | A1* | 8/2002 | Martin et al. ................. 455/456 |
| 2004/0225648 | A1* | 11/2004 | Ransom et al. ................... 707/3 |
| 2004/0225749 | A1* | 11/2004 | Pavlik et al. ................... 709/245 |
| 2005/0038717 | A1 | 2/2005 | McQueen et al. |
| 2005/0075097 | A1 | 4/2005 | Lehikoinen et al. |
| 2005/0094779 | A1* | 5/2005 | Kleinfelter et al. ........ 379/88.12 |
| 2005/0131750 | A1 | 6/2005 | Kogan et al. |
| 2005/0165615 | A1 | 7/2005 | Minar |
| 2005/0198021 | A1 | 9/2005 | Wilcox et al. |
| 2005/0267973 | A1* | 12/2005 | Carlson et al. ................. 709/228 |
| 2006/0173985 | A1* | 8/2006 | Moore ........................... 709/223 |
| 2006/0217126 | A1* | 9/2006 | Sohm et al. .................... 455/454 |
| 2007/0094390 | A1* | 4/2007 | Nussey .......................... 709/225 |

FOREIGN PATENT DOCUMENTS

| WO | WO2005089336 | 9/2005 |
| WO | WO2005098675 | 10/2005 |

OTHER PUBLICATIONS

Santo, Addy. "Santomania:Introducing BlogWave!", http://blogs.msdn.com/asanto/archive/2004/07/21/190667.aspx, Mar. 29, 2006.*
"Enterprise RSS: A Web Services Framework for Creating and Managing RSS in the Enterprise", MyST Technological Partners. Technical Brief, published: Mar. 2005.*
Stone, Biz. "Blogging: Genius Strategies for Instant Web Content". New Riders Publishing, publication date: Sep. 11, 2002. ISBN-10: 0-7357-1299-9.*
"RSS 2.0 Specification (UserLand)", UserLand Software. Address: http://www.rssboard.org/rss-2-0, publication date: Aug. 19, 2002.*

(Continued)

*Primary Examiner* — Ashok Patel
*Assistant Examiner* — Kevin Bechtel

(57) ABSTRACT

A really simple syndication (RSS) feed generator provides a user access to a set of data in the form of an RSS feed containing an object. The RSS feed generator allows the user to generate a feed definition using any of a user interface, a web based application programming interface, and an HTTP request. The RSS feed generator uses the feed definition provided by the user to generate the RSS feed and exposes the RSS feed in the form of RSS XML data. The RSS feed generator allows a business system to dynamically update the set of data contained in the RSS feed in a manner that allows a user to perform a plurality of functions on the RSS feed.

11 Claims, 6 Drawing Sheets

(56) References Cited

OTHER PUBLICATIONS

"Traction Teampage and Communicator Features," Traction Software, Inc., 2005, http://www.tractionsoftware.com/prd_features.html.

"Urchin RSS Aggregator," http://urchin.sourceforge.net/.

"Introducing BlogWave!" Santomania, Jul. 2004, Addys, http://blogs.msdn.com/asanto/archive/2004/07/21/190667.aspx.

* cited by examiner

RSS FEED GENERATOR

BACKGROUND

Computers and computer software make up a very important part of modern life and business. In today's business environment, for any organization to stay competitive, it is imperative that it uses computers and software applications to manage data, customers, employees, finances, etc. Business processes and workflows are typically managed using multiple forms of communications and organization. One method used by business organizations to exchange data with their partners, customers, etc., is by use of websites to publish relevant information. Web sites and other types of interactive systems commonly host electronic catalogs for assisting users in locating and evaluating various types of items. The items may, for example, include physical products, journal articles, movie and music titles, downloadable software, services, stock assets, businesses, and/or any other type of item that may be represented in a database. Electronic catalog systems also commonly support the ability for users to conduct various types of item-related transactions, such as purchasing an item, downloading an item, or selling an item.

However, current business systems do not have an easy way to update data and share data with users and other systems without implementing significant integration between various systems. Generally speaking, business data is typically stored securely behind a proprietary application interface or in a proprietary database. Access methods are available for application developers that allow them to build data-level integration and data-access applications. However, designing such data-level integration and data-access applications puts the burden on the end user to clearly specify which business data they need access to, how often they need it, and in what format. Given the information technology (IT) departments' development backlogs it is unlikely that an internal salesperson, let alone an external supplier, will ever see this data feed produced.

Typical solutions for implementing closer data integration include ad hoc query tools, ad hoc reporting tools, and direct database access. However, there are three important problems to keep in mind with respect to such ad hoc solutions. First, a typical user doesn't have the necessary skills to create these queries and reports. This problem puts us back in the IT pipeline. Second, a semi-skilled user has enough knowledge to be extremely dangerous to the application as a whole. There's usually nothing stopping the user from constructing such expensive queries that the application goes to its knees. And third, such ad hoc solutions only work for internal users. There's still no solution for external users to get secure access to the business data. Therefore, there is a need to provide a simpler web service model that allows efficient sharing and updating of data between various business entities.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A really simple syndication (RSS) feed generator provides a user access to a set of data in the form of an RSS feed containing an object. The RSS feed generator allows the user to generate a feed definition using any of a user interface, a web based application programming interface, and an HTTP request. The RSS feed generator uses the feed definition provided by the user to generate the RSS feed and exposes the RSS feed in the form of RSS XML data. The RSS feed generator allows a business system to dynamically update the set of data contained in the RSS feed in a manner that allows a user to perform a plurality of functions on the RSS feed. The RSS feed generator may provide a snapshot-in-time of a data provides's instance data. A client may treat that instance data as something that may be modified and sent back to a system of record.

An alternate embodiment of the RSS feed generator allows embedding an XSL style sheet processing instruction in the RSS XML data. A client using such RSS XML data may organize or view data using the embedded processing instructions. For example, using such an RSS feed generator a customer relationship management (CRM) software application may provide up-to-date information about various clients to a number of partners in a supply chain.

An alternate embodiment of the RSS feed generator includes a security check module that is used to enforce user level, class level and item level security in providing the RSS feed to the clients. Using the security module, the RSS feed generator may restrict data from the RSS feed to be available to only those clients who have relevant security permission to access such RSS feed data.

Yet another embodiment of the RSS feed generator allows generating RSS feed definition using a user interface where a client may select scope and attributes of an object to be included in the RSS feed. Alternatively, the scope and attributes of such an object may also be specified using an HTTP document or by using an application programming interface dynamically interacting with an RSS feed definition module of the RSS feed generator.

BRIEF DESCRIPTION OF DRAWINGS

The present patent is illustrated by way of examples and not limitations in the accompanying figures, in which like references indicate similar elements, and in which.

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Network

Figure 1:
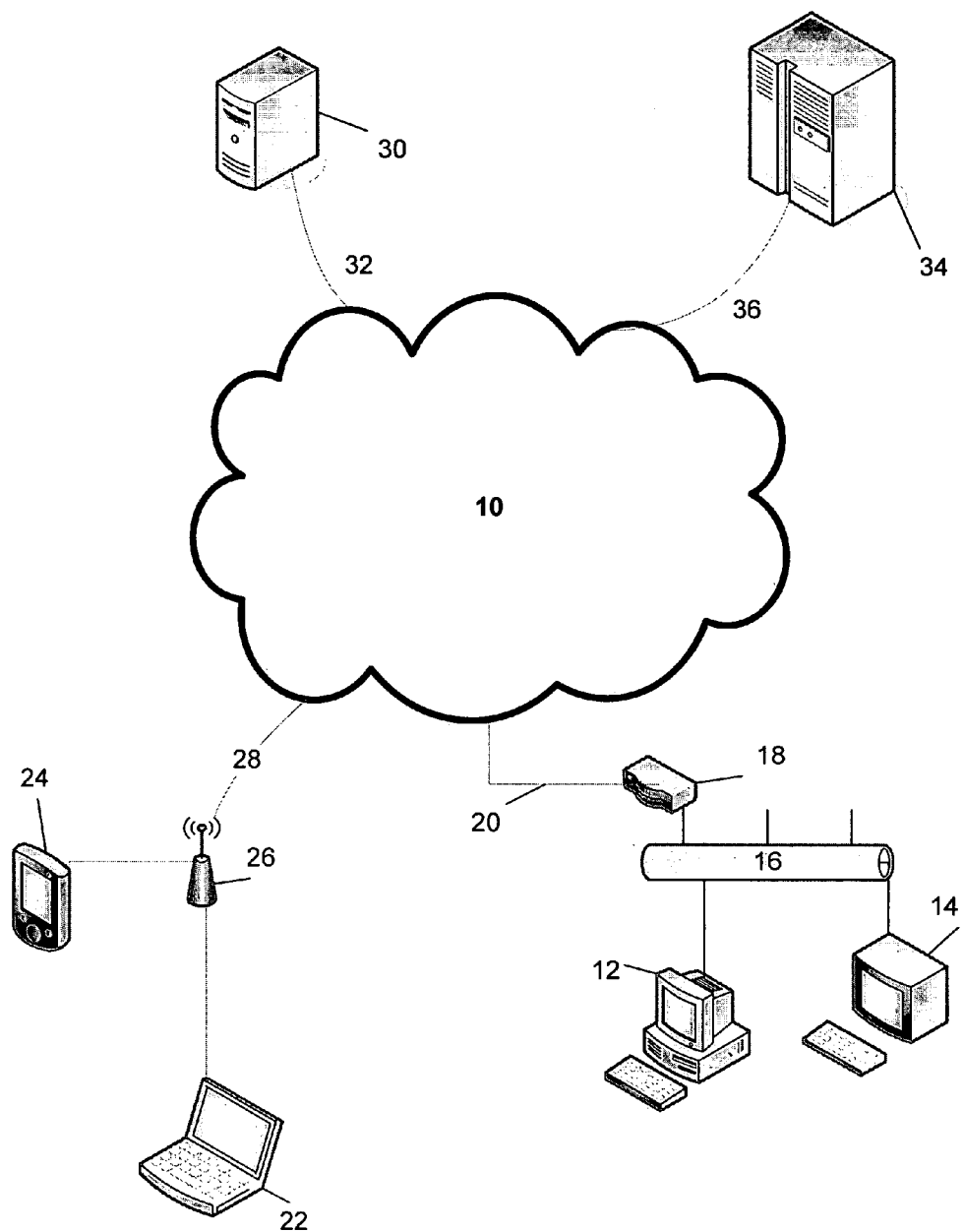
FIG. 1 is a block diagram of a network interconnecting a plurality of computing resources.

FIG. 1 illustrates a network 10 that may be used to implement a RSS feed generator described herein. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. As it will be described below in further detail, one or more components of the RSS feed generator may be stored and operated on any of the various devices connected to the network 10. For example, the RSS feed generator described in here may include the program code for defining scope of an object to be included in the RSS feed on the mainframe 34 while the program code for converting an RSS XML feed into XML schema definition format may be implemented on the personal computer 12.

Computer

Figure 2:
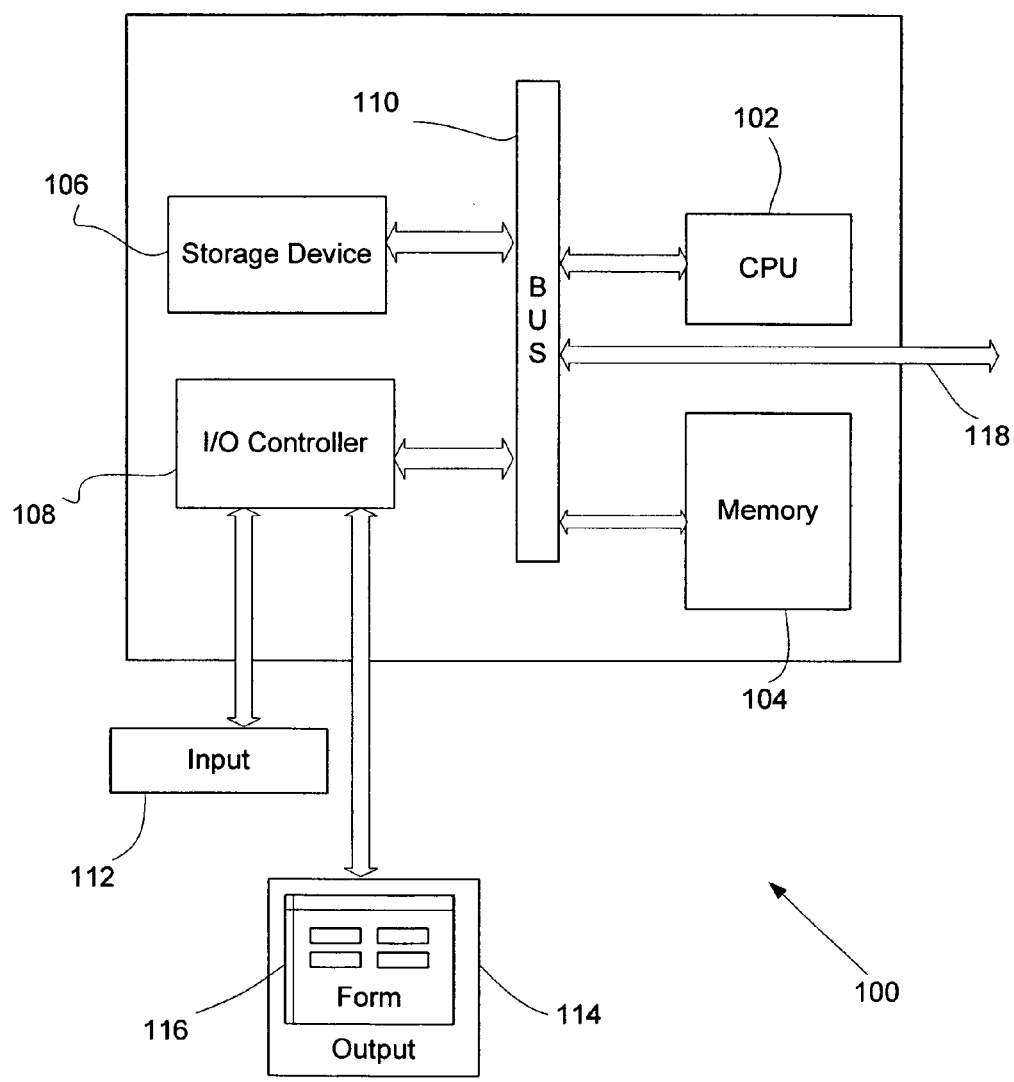
FIG. 2 is a block diagram of a computer that may be connected to the network of FIG. 1.

FIG. 2 illustrates a computing device in the form of a computer 100 that may be connected to the network 10 and used to implement one or more components of a RSS feed generator described herein. Components of the computer 100 may include, but are not limited to a central processing unit (CPU) 102, a memory 104, a storage device 106, an input/output controller 108, and a system bus 110 that couples various system components including the memory to the CPU 102. The system bus 110 may be any of several types of bus structures including a memory bus or memory controller, a peripheral bus, and a local bus using any of a variety of bus architectures.

The memory 104 may include computer storage media in the form of volatile and/or nonvolatile memory such as read only memory (ROM) and random access memory (RAM). A basic input/output system (BIOS), containing the basic routines that help to transfer information between elements within computer 100, such as during start-up, is typically stored in ROM. RAM typically contains data and/or program modules that are immediately accessible to and/or presently being operated on by processing unit 102. The memory 104 may also be used to store data related to one or more programs codes used by the computer 100 and/or the RSS feed generator.

The storage device 106 may typically include removable/non-removable, volatile/nonvolatile computer storage media. By way of example only, the storage device 106 may include a hard disk drive, a magnetic disk drive, nonvolatile magnetic disk, an optical disk drive, etc. One or more of the forms stored on the memory 104 may be populated using data stored on the storage device 106. The I/O controller may be used by the computer 100 to communicate with an input device 112, which may be a keyboard, a mouse, etc., an output device 114, which may be a monitor, a printer, etc.

RSS Feed Provider System

Figure 3:
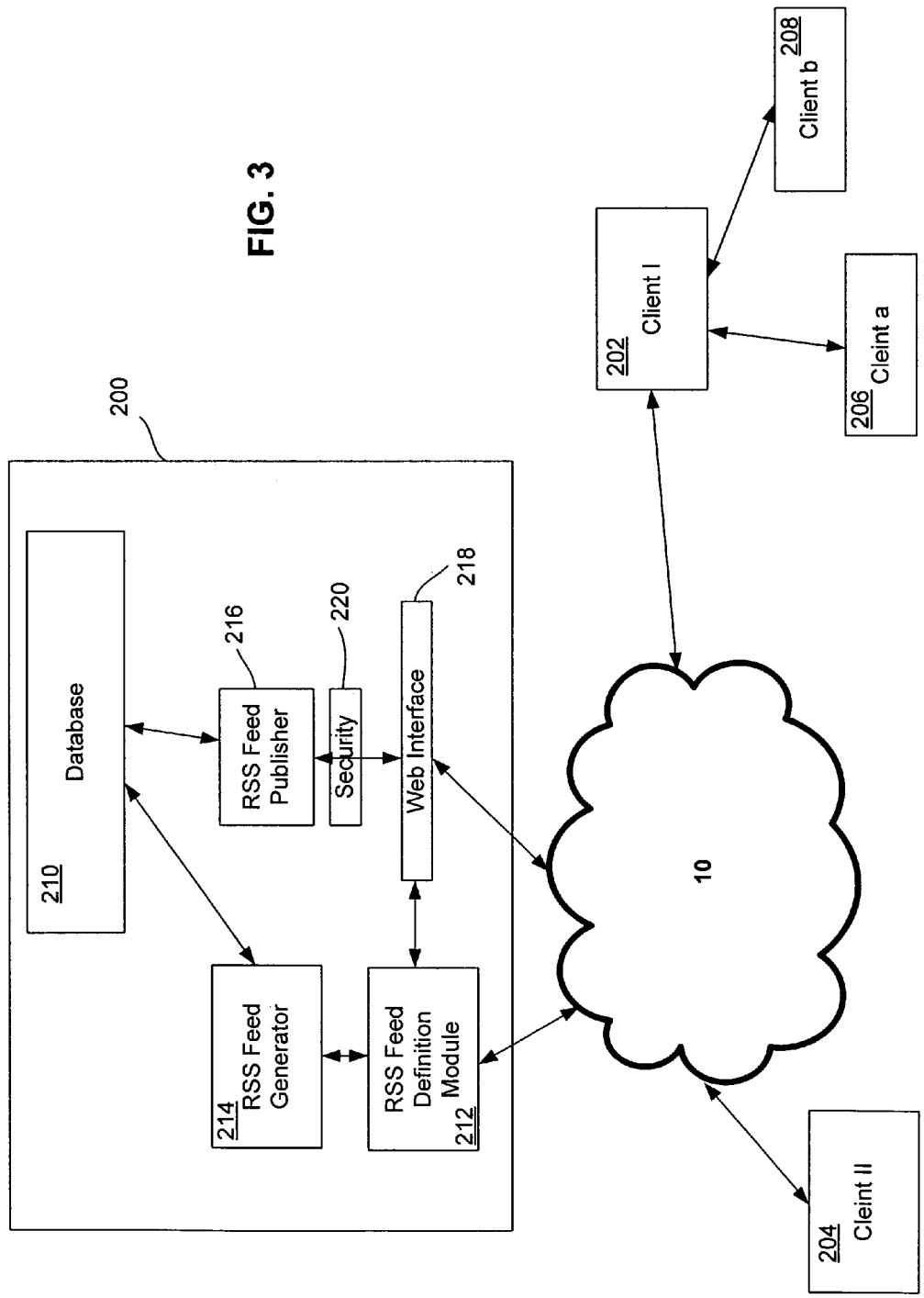
FIG. 3 illustrates a block diagram of a RSS feed generation system.

Really simple syndication (RSS) is a family of XML file formats for Web syndication used by, among other things, news websites and web-logs. The term RSS is also known as abbreviation of rich site summary or RDF site summary. Notwithstanding the term used, the RSS technology allows Internet users to subscribe to websites that have provided RSS feeds. FIG. 3 is an illustration of a RSS feed provider system 200, which may be implemented on the network 10. The RSS feed provider system 200 provides RSS feed to a number of clients 202-204 based on data located on the RSS feed provider system 200. Note that while in FIG. 3, all of the various components of the RSS feed provider system 200 are shown to be implemented on a single node on the network 10, in an alternate implementation, the various components may be located on different nodes on the network 10. Moreover, some of the components of the RSS feed provider system 200 may also be implemented on the nodes hosting the clients 202-204.

The RSS feed provider system 200 includes a database 210, an RSS feed definition module 212, an RSS feed generator 214, an RSS feed publisher 216, a web interface 218 and a security module 220. One or more of the modules 210-220 may be omitted in an alternate embodiment of the RSS feed provider system 200. Alternatively, one or more of the modules 210-220 may also be combined into one another, for example, the RSS feed generator 214 and the RSS feed definition module 212 may be combined into one module. As one of ordinary skill in the art would recognize, any of the various modules 210-220 may be implemented using software, hardware, firmware, or any combination thereof.

Moreover, one or more of the modules 210-220 may be implemented as part of other well known applications. For example, the database 210 may be part of a customer relation management (CRM) application, the web interface 218 may be part of a web hosting software application, the RSS feed definition module 212 may be part of an online accounting software, etc.

The database 210 may be any of the various database used by an entity that provides RSS feed of the data from the database 210. For example, the database 210 may be a (CRM) database, a human resources (HR) database, an accounting database, etc. The clients 202-204 may request RSS feed by communicating with the web interface module 218 via the network 10, such as the Internet, etc. The web interface module 218 may be implemented by using any of the well known web interface that may interact with various back-end applications. An example of such a web interface module 218 may be designed using a common gateway interface (CGI) software, etc.

Upon receiving RSS data feed from the RSS feed provider system 200, the clients 202-204 may make such feeds available to other clients, such as clients 206-208. Before making the RSS feed available to clients 206-208, the client 202 my further process the RSS feed. For example, the client 202 may sort the results of the RSS feed, restrict certain parts of the RSS feed from viewing by the clients 206-208, add further data to the RSS feed, etc. Moreover, the client 202 may employ its own version of the RSS feed provider system 200 to generate and communicate RSS feed to its clients 206-208. As one of ordinary skill in the art would recognize, multiple level nesting of such RSS feeds may be implemented.

Figure 4:
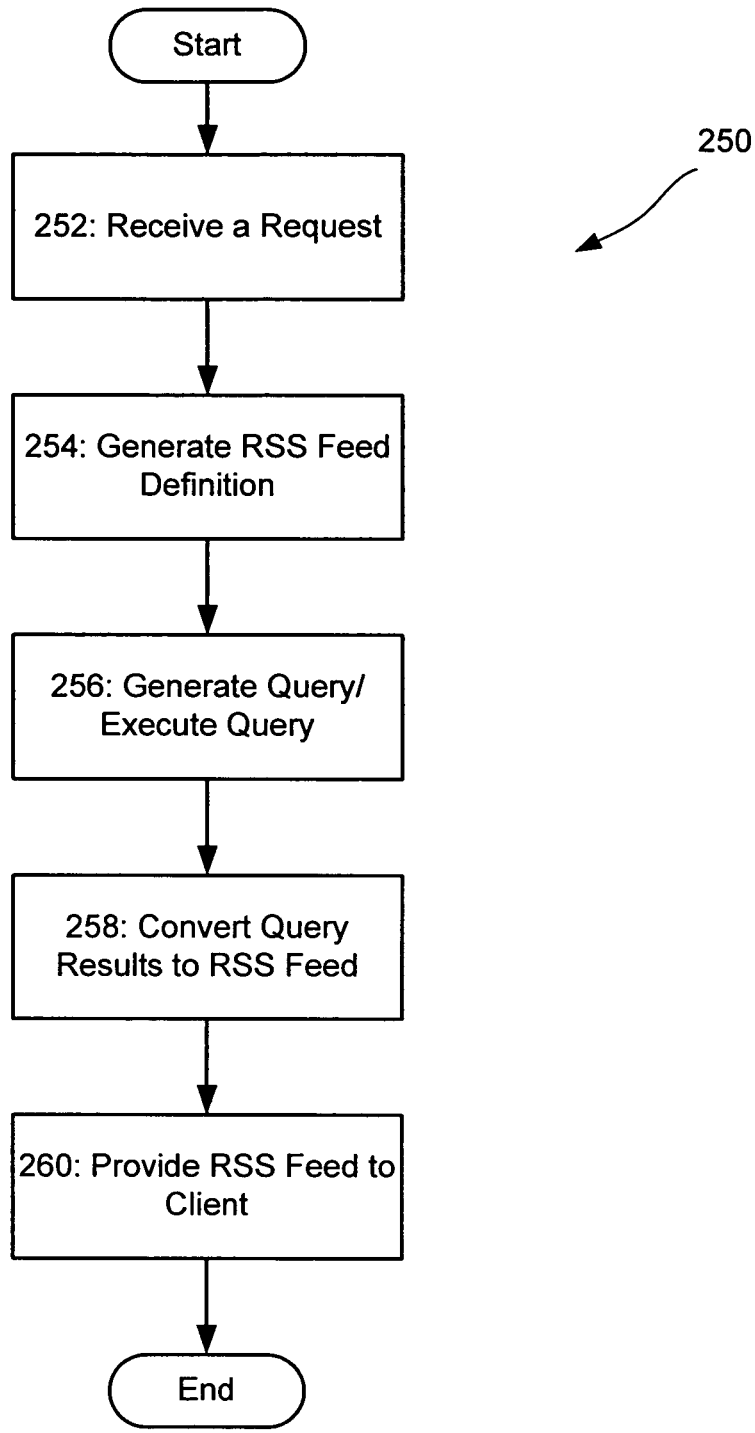
FIG. 4 is an exemplary flowchart of an RSS feed generation program that may be used by the RSS feed generation system.

Now referring to FIG. 4, an exemplary flowchart illustrates functioning of a RSS feed generation program 250 that may be used by the RSS feed provider system 200. The RSS feed generation program 250 may be implemented using one or more of the various modules of the RSS feed provider system 200. The RSS feed generation program 250 may be initiated in response to a request for RSS feed from one of the clients 202-204 or it may be initiated by any module of the RSS feed provider system 200. For example, in an implementation, the RSS feed generation program 250 may be initiated by the RSS feed generator 214 in response to a clock signal, in response to an update to the database 210, etc. The RSS feed generation program 250 may be implemented on the memory 104 of the computer 100 in the form of software or alternatively in the form of hardware, firmware or any combination thereof.

Now referring to the flowchart of the RSS feed generation program 250, a block 252 receives a request to generate an RSS feed based on data from the database 210. Such a request may be received from the clients 202-204 via the network 10 at the web interface 218. Such a request received at the web interface 218 may have various parameters of the requested feed included in it. Alternatively, the web interface module 218 may direct the request to the RSS feed definition module 212 to further assist in generating a feed definition. In an embodiment of the RSS feed provider system 200, client specific feed definitions may be stored on the RSS feed definition module 112. In a yet another embodiment, a client may construct a feed definition and supply the feed definition along with a request for the feed.

The RSS feed definition module 212 may interact with the client requesting the RSS feed using the network 10 in a number of different manners. For example, in a particular embodiment, the RSS feed definition module 212 may request the scope and/or the attributes of the object that is requested by the client. The scope of the object requested by the client may include the number of data fields, an identification of the data source providing the data fields, the names of the data fields, etc. Various attributes of the requested object may include information about which fields are to be sortable, the update time for the field values, etc. For example, the RSS feed request may have a time stamp attached to it specifying the last time the requested object was received and therefore any updates to the object from that time may need to be provided in the RSS feed containing the object.

Subsequently, at a block 254, the RSS feed definition module 212 generates the feed definition that may be used to get data from the database 210 to generate the requested RSS feed. Note that while in the embodiment of the RSS feed generation program 250 described in here, the steps of receiving object information and the step of generating feed definition are described as two separate functions, in an alternate environment, these two steps may be implemented together.

The RSS feed definition module 212 may generate the feed definition using a number of different methods, including, but not limited to, by using a user interface, by using a web based application programming interface, or by using an hypertext transfer protocol (HTTP) request. For example, the RSS feed definition module 212 may provide a user interface that may be activated by the client requesting the RSS feed where the client may define the scope and the attributes of the requested object by making various selections on the user interface or by inputting information in the user interface.

Figure 5:
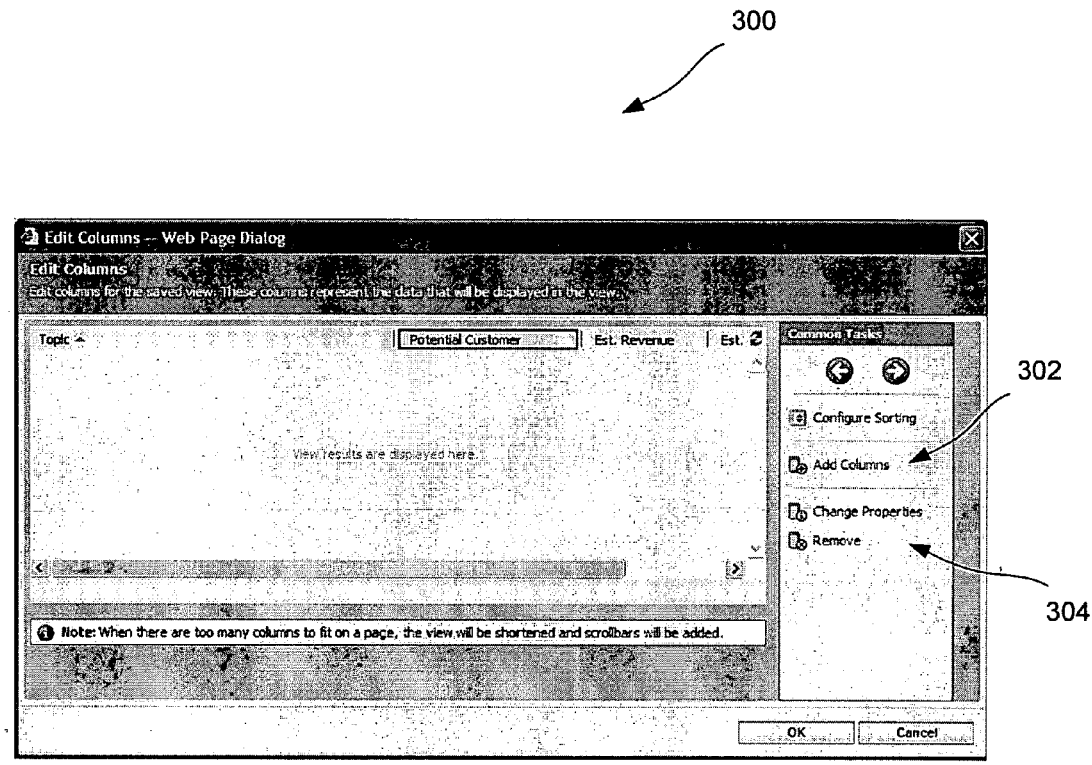
FIG. 5 is an exemplary filter definition screen that may be used by the RSS feed generation program to define a feed definition.

An example of such a user interface is illustrated by a column customization dialog interface 300 illustrated in FIG. 5. The column customization dialog interface 300 allows users to define which columns are to be included in the RSS feed generation definition. For example, a user may add a field to be included in the RSS feed by selecting the column for that field using the "Add Columns" button 302 of the column customization dialog interface 300. Similarly, a user can remove a selected field by highlighting the field to be removed and then selecting the "Remove" button 304 of the column customization dialog interface 300.

Alternatively, the RSS feed definition module 212 may provide an application programming interface (API) that receives definition of a query, as provided by a client requesting an object, and converts the definition into the format that can be used by the RSS feed definition module 212. Yet, alternatively, the RSS feed definition module 212 may receive the object definition in an HTTP document and extract the object definition from such an HTTP document.

After the generation of the feed definition, at a block 256, the RSS feed definition module 212 may generate an RSS feed with the requested object by converting the feed definition into the RSS feed. To convert the RSS feed definition into an RSS feed, the RSS feed definition module 212 may define and execute a query on the database 210, where the query is defined using the feed definition. The RSS feed definition module 212 may use a number of predefined query parameterization and construction routines to define the query from the feed definition.

Subsequently, at a block 258, the RSS feed definition module 212 may convert the query results into the RSS feed. There are currently seven RSS formats, of which three formats are widely used and converting results of a query into RSS feed conforming to any of these formats is well known to one of ordinary skill in the art.

At a block 260, the RSS feed definition module 212 may provide the RSS feed to the client requesting the RSS feed. Providing the RSS feed to the client may comprise exposing the RSS feed as a web page using the web interface 218. Alternatively, the web interface 218 may convert the RSS feed into RSS XML data, generate an RSS feed URL for the RSS XML data and communicate the RSS feed URL to the client requesting the RSS feed. The client may incorporate the RSS feed URL into its own web page to expose the query results underlying the RSS feed. Because the RSS feed is constructed as an object with various sortable attributes provided to the client, the client may also sort the data contained in the RSS feed, generate different views based on the RSS feed and/or perform its own queries on the data contained in the RSS feed.

Figure 6:
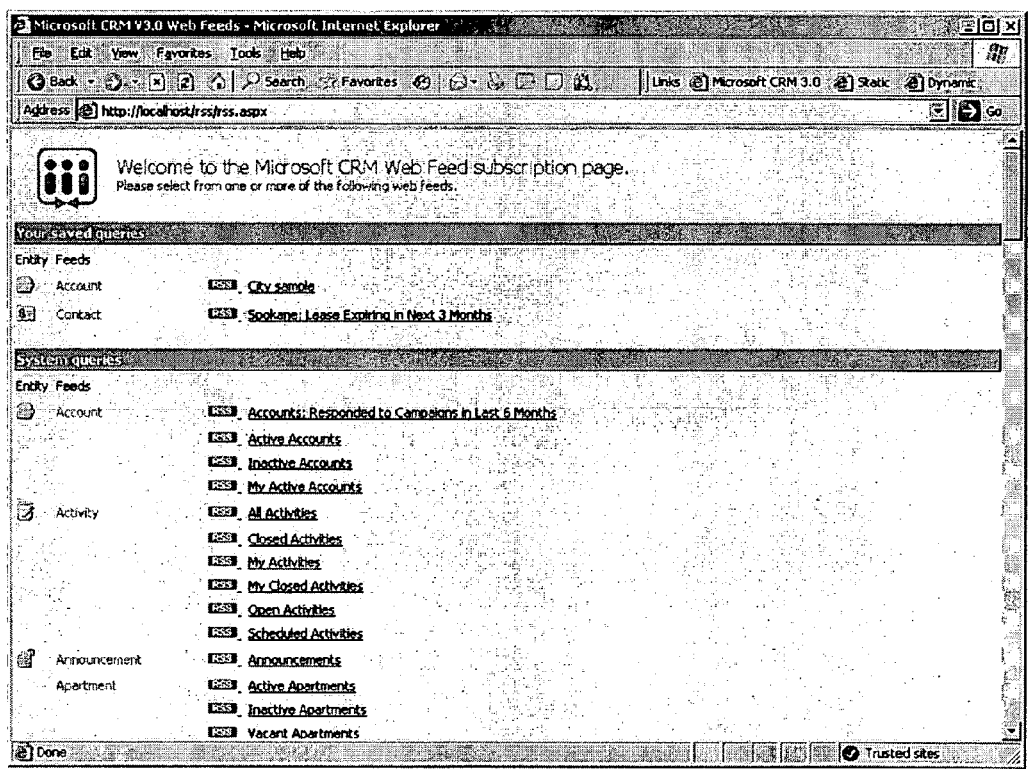
FIG. 6 illustrates an RSS web feed subscription page that may be used by clients to view various RSS feeds available from an application.

In an alternate embodiment, the RSS feed generator 200 may expose various RSS feeds available to a client as a web page. Such a web page may display only those feeds to a client for which the client has a permission to view. FIG. 6 illustrates an RSS web feed subscription page 350 that may be used by clients to view various RSS feeds available from a CRM application.

This feature is specifically useful to clients using the RSS feeds to perform various operations. Especially, given the prevalence of RSS readers build into various Internet browsers and the RSS platform built into various operating systems, the RSS feeds provides clients with the choice to combine a query construction model, RSS feed generation model, and a query execution models into one produce. Such a combined product may allow users to construct queries of the business data that they're interested in and access those queries as RSS feeds from any device or application that supports RSS. Such a combined product may also allow a user operating a database to create a query specific to a particular partner or supplier, share that query as a publication, and let the partner or supplier have direct access to data necessary to keep the supply chain full.

In an implementation of the RSS feed generation program 250, an RSS feed may include various items, where each feed item may carry with it enough metadata, as defined by RSS, to provide a reasonably rich client-side display. Note that other rendering options are also available. For example, in one embodiment, the metadata related to an item may contain a <description> element containing a short, text-based (sometimes HTML) introduction or synopsis of the item. The item may also have a <link> element that indicates to the client where to find the complete document specified in the item. This leaves all rendering to the client and requests that the user follow the <link> URL to read the entire document.

In another embodiment, an RSS feed may include an XSL style sheet processing instructions (PI) into the RSS XML data. Clients that honor this PI can then leave the ultimate layout and the display of the RSS feed to the RSS feed provider. In such a case, the RSS feed provider has the burden of determining client capabilities (display width, available user input devices, etc.) and of providing a smart style sheet.

As one of ordinary skill in the art would appreciate, not all the blocks of the RSS feed generation program 250 need to be performed for a given implementation of the RSS feed provider system 200. As some of the blocks of the RSS feed generation program 250 may be used primarily to increase the efficiency of the RSS feed generation program 250, one or more such blocks may be omitted in a given implementation without affecting the functionality of the RSS feed provider system 200. Moreover, one or more of the blocks in the RSS feed generation program 250 may also be implemented in an alternate order without affecting the functionality of the RSS feed provider system 200.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of providing a set of data from a database in the form of a really simple syndication (RSS) feed containing an object, the method comprising:

dynamically updating the set of data;
dynamically receiving from a client, via an application programming interface, a definition of a query requesting an object, the object having:
   a defined scope, wherein the defined scope comprises: at least one of a number of data fields included in the object from the set of data, an identification of the data source providing a data field, or the name of a data field, and
   defined attributes, wherein the defined attributes comprise at least one of information identifying which fields are sortable, or an update time for the field values;
converting the definition of the query to an RSS feed definition;
querying the database using the RSS feed definition;
converting results from the query to an RSS feed including the requested object;
publishing the RSS feed to the client;
providing a user interface enabling a user to further define the scope and attributes related to the requested object provided by the RSS feed for creating a customized version of the RSS feed;
receiving a request from a first user via the user interface for the customized version of the RSS feed, the request including a first further defined scope and attributes related to the object provided by the RSS feed;
generating a first customized feed definition using the first further defined scope and the attributes of the object;
applying the first customized feed definition to the RSS feed to create a first customized RSS feed;
providing the first user access to the first customized RSS feed;
performing one or more functions on the first customized RSS feed to modify data included in the first customized RSS feed and making the modified data available to other users;
receiving a second request from a second user for another customized version of the RSS feed, the second request including a second further defined scope and other attributes related to the object provided by the RSS feed;
generating a second customized feed definition using the second further defined scope and the attributes of the object;
applying the second customized feed definition to the RSS feed to create a second customized RSS feed;
providing the second user an access to the second customized RSS feed; and
performing one or more functions on the second customized RSS feed to modify data included in the second customized RSS feed and making the modified data available to other users.

2. The method of claim 1, wherein receiving the request including attributes related to the object comprises receiving an attribute of an update time field for specifying the last time the object was received.

3. The method of claim 1, wherein generating the feed definition further comprises generating the feed definition using a web based application programming interface (API).

4. The method of claim 1, wherein applying the first customized feed definition to the RSS feed to create the first customized RSS feed further comprises restricting data from the RSS feed to be available to the user only when the user has a relevant security permission to access the RSS feed data.

5. The method of claim 1, wherein providing the user an access to the RSS feed further comprising applying a security check at a user level.

6. The method of claim 1, wherein providing the user an access to the RSS feed further comprising applying a security check at a class level.

7. The method of claim 1, wherein providing the user an access to the RSS feed further comprising applying a security check at an item level.

8. An RSS feed generator system for providing a set of data from a database to a user in the form of a really simple syndication (RSS) feed containing an object, the system comprising:
   a business system dynamically updating the set of data;
   a central processing unit (CPU) of a computer with a feed definition module executed on the CPU, causing the CPU to:
      receive a request from a client to generate an RSS feed containing an object based on the set of data from the database, the request in the form of an HTTP document specifying an object definition comprising a scope and attributes of the object;
      define a scope of the object including: at least one of a number of data fields from the set of data from the database, an identification of a data source providing a data field, or the name of a data field according to the object definition in the HTTP document;
      define attributes of the object including at least one of: information identifying which fields are to be sortable, or an update time for the field values, according to the object definition in the HTTP document;
      generate an RSS feed definition using the scope and the attributes of the object;
      query the database using the RSS feed definition;
      convert a result from the query to an RSS feed including the object;
      publishing the RSS feed to the client;
      receive, from a plurality of user interface modules executed on a plurality of client processors, feed requests further defining scope and attribute characteristics related to the object provided by the RSS feed for a customized version of the RSS feed, and
      generate a corresponding customized RSS feed definition using individual further defined scope and attribute characteristics of the object included in each feed request and convert each of the customized RSS feed definitions to individual RSS feeds; and
   a feed publisher module executed on the CPU providing the each of the plurality of users an access to the individual RSS feed of the corresponding customized feed definition.

9. The RSS feed generator system of claim 8, wherein the feed definition module further generates the feed definition using a web based application programming interface (API).

10. The RSS feed generator of claim 8, wherein the feed publisher module (1) converts the RSS feed definition in the form of RSS XML data; and (2) embeds an XSL style sheet processing instruction (PI) into the RSS XML data.

11. The RSS feed generator of claim 8, further comprising a security module restricting data from the RSS feed to only users having permission to access the RSS feed data.

* * * * *